Aug. 25, 1953 — M. STUBNITZ — 2,649,897
SPRING AND AIR CUSHION SEAT
Filed May 20, 1952 — 2 Sheets-Sheet 1
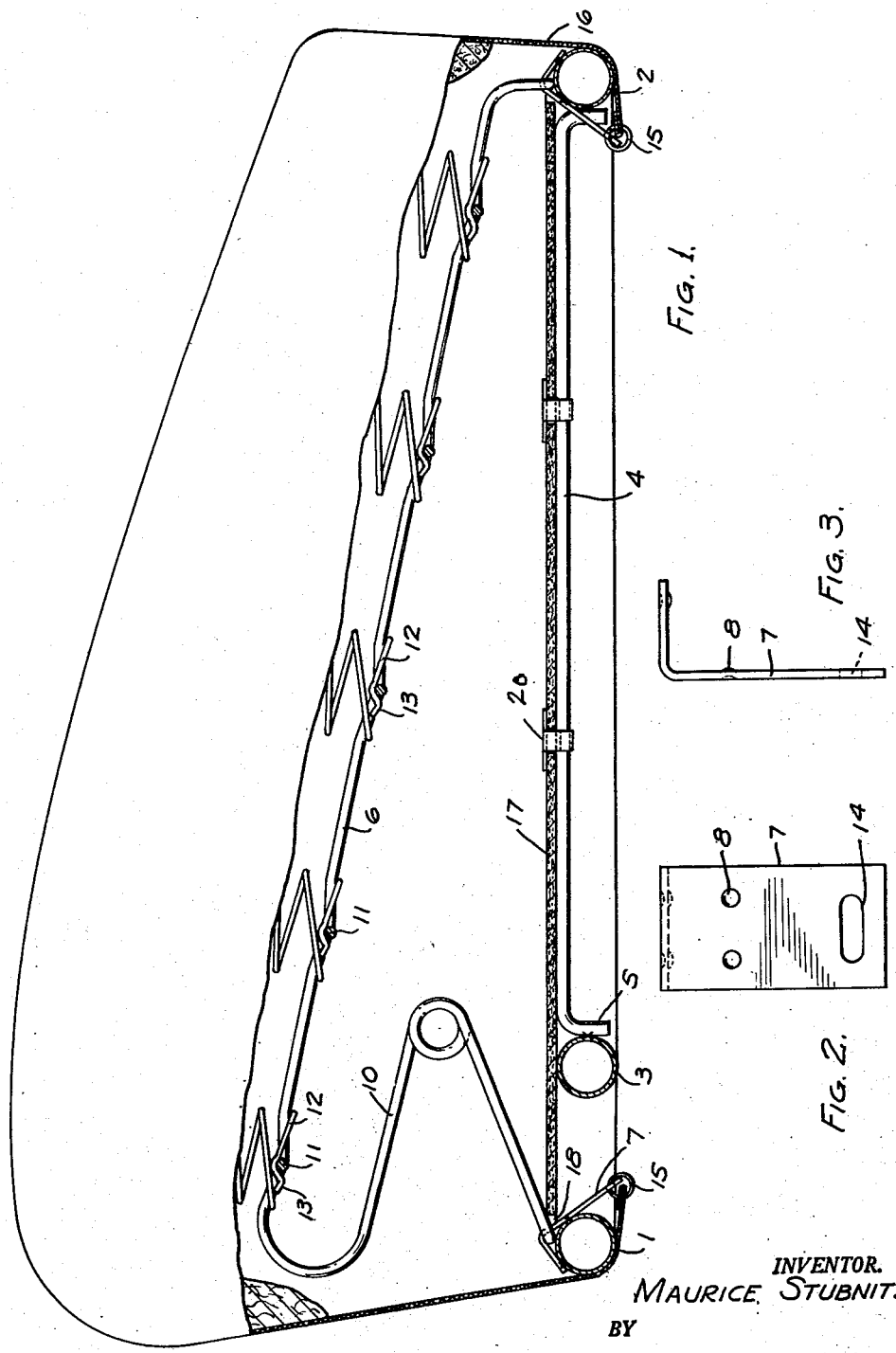
INVENTOR.
MAURICE STUBNITZ
BY
ATTORNEYS.

Aug. 25, 1953 M. STUBNITZ 2,649,897
SPRING AND AIR CUSHION SEAT
Filed May 20, 1952 2 Sheets-Sheet 2

INVENTOR.
MAURICE STUBNITZ
BY
Barnes, Kisselle, Laughlin & Raisch
ATTORNEYS.

Patented Aug. 25, 1953

2,649,897

UNITED STATES PATENT OFFICE 2,649,897

SPRING AND AIR CUSHION SEAT

Maurice Stubnitz, Adrian, Mich., assignor to Stubnitz-Greene Spring Corporation, Adrian, Mich., a corporation of Michigan Application May 20, 1952, Serial No. 288,813

4 Claims. (Cl. 155—179)

This invention relates to spring and air cushion seats. Spring and air cushion seats are used quite extensively in the cabs of trucks and commercial vehicles. It is the object of these inventions to combine a seat spring with a seat in which air is trapped between the upholstery and a diaphragm. This modifies and softens the action of the springs so that the spring action is not so violent, being tempered by the dashpot action of the air trapped in the cushion.

It is the object of the present invention to combine a seat spring of the spring wire stringer type with an air cushion in which the diaphragm that traps the air in the cushion is located and held in place by means of the special anchors for the stringers which I attach to the seat frame and by the superimposed spring structure.

Referring to the drawings:

Fig. 1 is a cross section of the combined spring and air cushion.

Fig. 2 is a detail of the anchor clip for the stringers.

Fig. 3 is an elevation of this clip taken at a 90° point of view from the view shown in Fig. 2.

Figure 4:
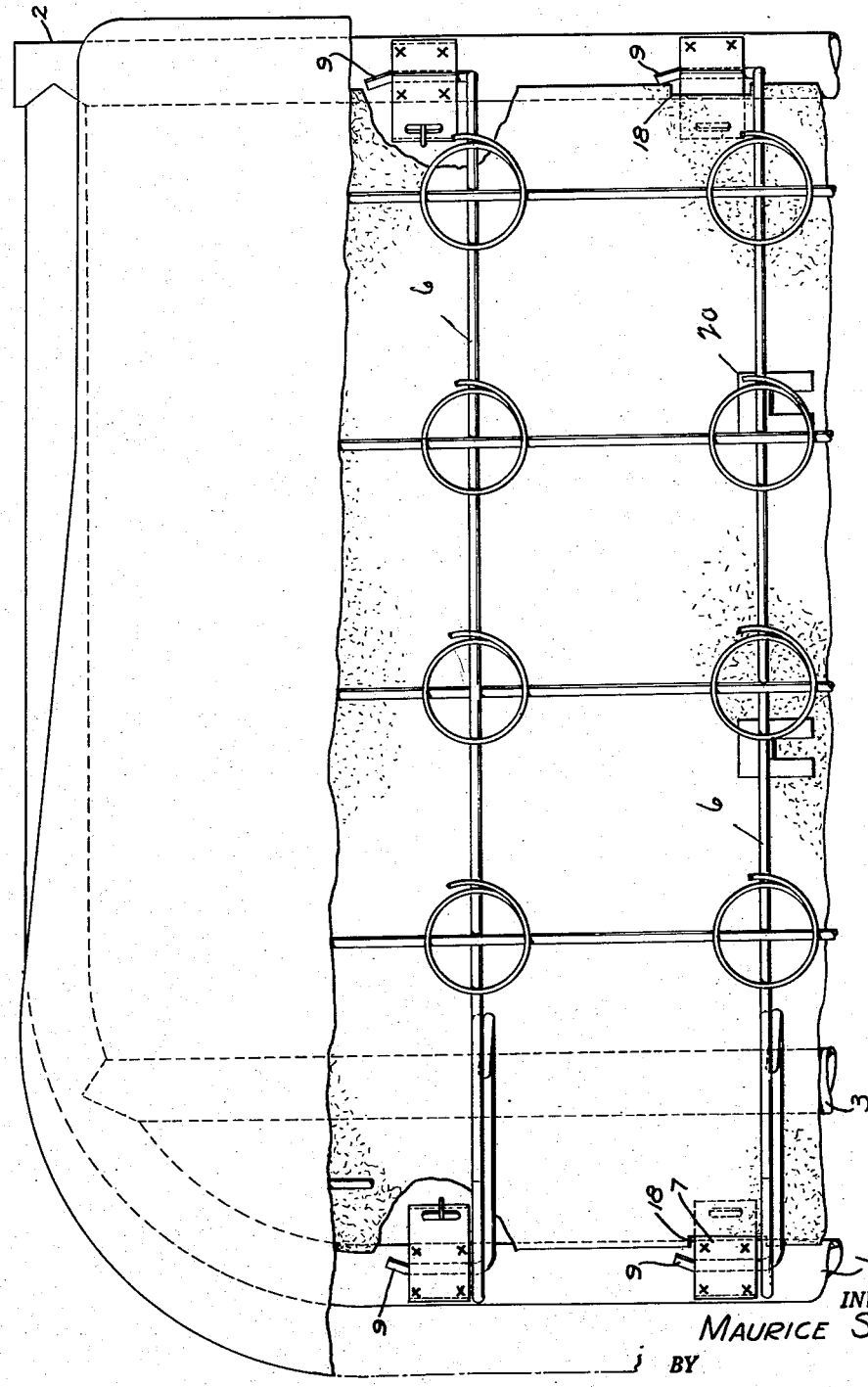
Fig. 4 is a fragmentary plan view of the spring assembly.

The seat frame is formed by the tube 1 which forms the front of the seat and the ends of the seat, and this tube is welded to a tube 2 that forms the rear of the frame. At the front the frame is provided with a second tube 3 which is parallel to the front tube 1 and acts as a reinforcing bridge for the front of the frame. Heavy spanner wires 4 extend from this tube 3 to the rear tube 2. The ends of the spanner wires are turned over as at 5 to form elbows which are welded to the tubes 2 and 3.

At the points along the tubes where the stringer wires 6 are to be located, inverted L-shaped clips 7 are welded; preferably these L-shaped clips are provided with projections 8 which allow the clips to be spot or projection welded to the top of the tube. These anchor clips have the L inverted so that the elbow of the L straddles the top of the tube and when the clip is welded in place a tunnel is formed to receive the turned over end 9 of the stringer wire 6. Preferably the stringer wires have jack springs 10 at the front in the form of safety pin type of springs. The stringers are crossed by longitudinal wires to form the mat or deck which supports the truncated hourglass type springs 12, which are, in effect, half length hourglass type springs. The lowermost coil of these load-carrying springs is screwed through the intersecting wires to form a lock for locking the wires together and at the same time anchoring the truncated coil springs in place. The ends of the coil springs are slightly upset as at 13 to hold the spring from releasing itself after it has been screwed in place.

The anchor clips 7 are each provided with a slot 14 to receive the hog rings 15 which secure the trim material or upholstery cover 16 in place after the upholstering cover has been drawn over the padding and the spring.

The diaphragm, or the fiberboard bottom 17 is notched as at 18 to provide recesses straddling the L-shaped anchor clip 7 as shown in Fig. 4. This fiberboard diaphragm may be dropped in place over the anchor clips before the stringers are secured to the clips. It is secured firmly to the spanner wires by clips 20. These may be used on all the spanner wires or some. This prevents rattling or bouncing.

The stringers are assembled to the frame by pushing the turned over ends 9 of the stringers into the tunnels formed between the elbow of the L and the top of the tubular frame. After the load supporting springs 12 have been screwed into the intersecting wires to form a deck, the spring assembly can be completed by applying the top border frame (not shown) and the interconnecting coiled tie springs (not shown). The spring manufacturer can assemble the stringers and the coil springs and the top frame and the tie springs at the factory and ship the spring cushion to the automobile manufacturer or the body builder. Then he provides the tubular frame, drops the fiberboard diaphragm in place, and then assembles the spring by working the turned over ends of the stringers into the tunnels formed by the anchor clips. The upholstery is put in place, then the cover or the trimming drawn over this and hog ringed to the clips through the slots 14 in the clips.

Or the spring elements may be shipped knocked down and the stringers secured to the anchor strips by pushing the turned over ends in the tunnels after the diaphragm 17 has been put in place and thereupon the rest of the spring may be assembled by screwing the load carrying springs into the intersection of the wires that form the deck, and etc.

The stringers do not have to be of the type shown in the drawings including the jack or safety pin type of springs at the front. They might be some other type of stringer which acts to support the load.

What I claim is:

1. A seat spring and air cushion having in combination a tubular frame, a plurality of spanner wires connecting the front and rear frame members, a plurality of anchor clips welded to the frame and forming tunnels above the frame, a seat spring structure including a plurality of spring wire stringers with down-turned legs having turned over ends fitted in the tunnels, and an air-trapping diaphragm or bottom having notches on the edges and the notches fitted over the anchor clips and the diaphragm seated upon the spanner wires and held in place by clips passing through the diaphragm and pinched over the spanner wires.

2. The combination claimed in claim 1 with the inside arms of the anchor clips slotted to receive hog rings.

3. A seat spring cushion having in combination a metal frame member forming a substantially rectangular enclosure, a plurality of anchoring clips of inverted L-shape, each clip being inverted and the L straddling the top of the frame and the two arms of the L welded to the frame to form a tunnel at the elbow formed by the arms, a notched air trapping diaphragm dropped over the frame and the notches straddling the L anchor clips, and spring stringer wires with turned over ends adapted to be fitted in the said tunnel thereby helping to hold the air trapping diaphragm in place.

4. The combination claimed in claim 3 in which the frame member is tubular and the diaphragm is fiberboard.

MAURICE STUBNITZ.

References Cited in the file of this patent

UNITED STATES PATENTS

| Number | Name | Date |
|---|---|---|
| 2,526,184 | Williams et al. | Oct. 17, 1950 |